United States Patent
Chern et al.

(10) Patent No.: US 9,817,238 B2
(45) Date of Patent: Nov. 14, 2017

(54) OPTICAL DEVICE

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 10 days.

(21) Appl. No.: 15/013,430

(22) Filed: Feb. 2, 2016

(65) Prior Publication Data

US 2017/0168308 A1    Jun. 15, 2017

(30) Foreign Application Priority Data

Dec. 11, 2015  (CN) .......................... 2015 1 0923568
Dec. 11, 2015  (TW) ............................ 104141735 A

(51) Int. Cl.
  *G02B 27/14*    (2006.01)
  *G02B 27/12*    (2006.01)
(52) U.S. Cl.
  CPC ......... *G02B 27/144* (2013.01); *G02B 27/126* (2013.01)
(58) Field of Classification Search
  USPC ...... 362/235, 231, 245; 348/208.7; 359/292, 359/649
  See application file for complete search history.

(56) References Cited

U.S. PATENT DOCUMENTS

| 5,971,835 | A | * | 10/1999 | Kordonski | B24C 3/18 |
| | | | | | 451/36 |
| 6,014,206 | A | * | 1/2000 | Basting | G01B 11/26 |
| | | | | | 356/138 |
| 9,223,122 | B2 | * | 12/2015 | Inoko | G02B 27/0905 |
| 2005/0068626 | A1 | * | 3/2005 | Dang | G01C 15/004 |
| | | | | | 359/566 |
| 2005/0174640 | A1 | * | 8/2005 | Chen | G02B 27/283 |
| | | | | | 359/484.02 |
| 2010/0133417 | A1 | * | 6/2010 | Nagahama | G02B 7/36 |
| | | | | | 250/201.4 |
| 2011/0222024 | A1 | * | 9/2011 | Lu | G02B 27/102 |
| | | | | | 353/31 |

(Continued)

*Primary Examiner* — Allyson Trail
(74) *Attorney, Agent, or Firm* — Muncy, Geissler, Olds & Lowe, P.C.

(57) ABSTRACT

An optical device includes a structured light generation unit and a beam splitter assembly. The structured light generation unit generates a structured light. The beam splitter assembly is arranged in a travelling path of the structured light. The beam splitter assembly includes a semi-transmissive semi-reflective structure. A portion of the structured light is transmitted through the semi-transmissive semi-reflective structure of the beam splitter assembly and projected on a projection surface. Consequently, a first structured light pattern is formed on the projection surface. Another portion of the structured light is reflected by the semi-transmissive semi-reflective structure of the beam splitter assembly and projected on the projection surface along a different path. Consequently, a second structured light pattern different from the first structured light pattern is formed on the projection surface. The number of structured light patterns or the projected area is correspondingly adjusted.

32 Claims, 5 Drawing Sheets

(56) References Cited

U.S. PATENT DOCUMENTS

2011/0241986 A1* 10/2011 Feng ..................... G03B 21/14
 345/158
2016/0173836 A1* 6/2016 Yu ........................ H04N 9/3105
 348/208.7

* cited by examiner

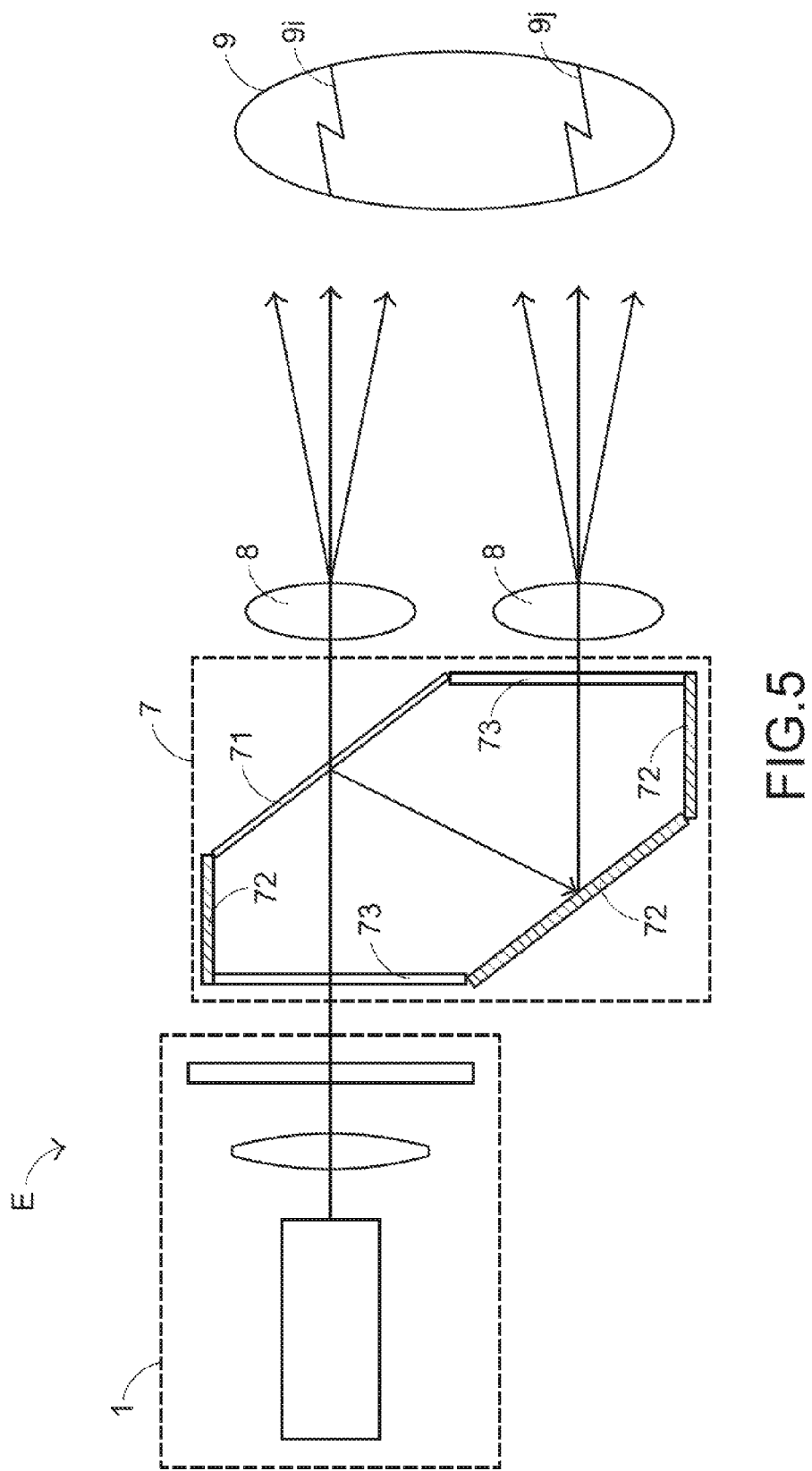

OPTICAL DEVICE

FIELD OF THE INVENTION

The present invention relates to an optical device, and more particularly to an optical device with a beam splitter assembly for multiplying structured light patterns.

BACKGROUND OF THE INVENTION

A structured light is a lighting apparatus by which lighting pattern is with a specified feature, structure or form over one assigned surface or object. It has been applied to many categories for many purposes, mainly the function is to enhance the contrast of object with respect to the others in environment such that identification or recognition can be greatly achieved. With increasing development of optical technologies, the structured light is designed to have a linear pattern, a planar pattern, a grid pattern or even a more complicated light pattern. Consequently, the structured light can be applied to many emergent fields such as 3D contour regeneration technologies, distance measurement technologies, anti-counterfeiting recognition technologies, motion sensitive technologies, novel appearance designs and associated applications. By using the structured light, the conventional warning signs can be extensively applied to medical applications or biomedical applications that require pollution-free environments. In other words, the importance of the structured light is gradually increased and the associated technologies are widely developed.

Generally, a structured light generation unit is used for generating a structured light. When the structured light is projected on an object, a structured light pattern is formed on a surface of the object. The structured light pattern on the surface of the object is an important identification feature for judging the spatial information. However, regardless of whether the structured light pattern is a linear pattern, a planar pattern or a grid pattern, the density and/or the number of the structured light patterns are still insufficient or the corresponding projection area is insufficient in many applications once a higher resolution is targeted. Consequently, the structured light pattern cannot be used in the subsequent process of precisely calculating the spatial information. Moreover, in case that the projected contents of the structured light pattern are not diversified, the applications of the structured light pattern are limited. In other words, the optical device for generating the structured light still needs to be improved.

SUMMARY OF THE INVENTION

For solving the drawbacks of the conventional technologies, the present invention provides an optical device for increasing the numbers of lines, planes and/or grids on a projection surface. Consequently, the structured light pattern can be used in the subsequent process of precisely calculating the spatial information. Moreover, the resolution is increased, and the projected contents of the structured light pattern are more rich and available for development and identification.

In accordance with an aspect of the present invention, there is provided an optical device. The optical device includes a structured light generation unit and a beam splitter assembly. The structured light generation unit generates a structured light. The beam splitter assembly is arranged in a travelling path of the structured light, and includes a semi-transmissive semi-reflective structure and a total reflection structure. First portions of plural light beams of the structured light are transmitted through the semi-transmissive semi-reflective structure of the beam splitter assembly and projected on a projection surface, so that a first structured light pattern is formed on the projection surface. Second portions of the plural light beams of the structured light are reflected by the semi-transmissive semi-reflective structure and the total reflection structure of the beam splitter assembly sequentially and projected on the projection surface, so that a second structured light pattern is formed on the projection surface.

In an embodiment, the second structured light pattern is a scale-up pattern of the first structured light pattern, or the second structured light pattern is a scale-down pattern of the first structured light pattern, or the second structured light pattern and the first structured light pattern are as large as each other but not completely overlapped with each other.

In an embodiment, a light-inputting side of the beam splitter assembly includes a light-inputting surface and the total reflection structure, and a light-exiting side of the beam splitter assembly is coated with the semi-transmissive semi-reflective structure. After the plural light beams of the structured light are directed to the semi-transmissive semi-reflective structure through the light-inputting surface, the first portions of the plural light beams of the structured light are projected out to the projection surface through the semi-transmissive semi-reflective structure so as to form the first structured light pattern on the projection surface. In addition, the second portions of the plural light beams are reflected by the semi-transmissive semi-reflective structure and the total reflection structure sequentially and projected out to the projection surface through the semi-transmissive semi-reflective structure so as to form the second structured light pattern on the projection surface. Alternatively, a light-inputting side of the beam splitter assembly includes a light-inputting surface and the total reflection structure, and a light-exiting side of the beam splitter assembly is coated with the semi-transmissive semi-reflective structure and an anti-reflective structure. After the plural light beams of the structured light are directed to the semi-transmissive semi-reflective structure through the light-inputting surface, the first portions of the plural light beams of the structured light are projected out to the projection surface through the semi-transmissive semi-reflective structure so as to form the first structured light pattern on the projection surface. In addition, the second portions of the plural light beams are reflected by the semi-transmissive semi-reflective structure and the total reflection structure sequentially and projected out to the projection surface through the anti-reflective structure so as to form the second structured light pattern on the projection surface.

In an embodiment, at least one of the semi-transmissive semi-reflective structure and the total reflection structure is a coating with a non-uniform thickness.

In an embodiment, the beam splitter assembly is a single-wedge beam splitter assembly, a double-wedge beam splitter assembly or a combined beam splitter assembly.

In an embodiment, a numerical aperture of the beam splitter assembly covers the beam spread angles and ranges corresponding to the first structured light pattern and the second structured light pattern.

In an embodiment, the beam splitter assembly is made of a plastic material, and produced by an injection molding process.

In an embodiment, the beam splitter assembly is produced by forming an ultraviolet curable material on a substrate, wherein the substrate is made of a plastic material, a glass material or silicon.

In an embodiment, the beam splitter assembly is made of an ultraviolet curable material, and directly formed or indirectly formed by multiple steps.

In an embodiment, the beam splitter assembly is made of a thermosetting material, and directly formed or indirectly formed by multiple steps.

In an embodiment, the beam splitter assembly has an asymmetric aspheric surface.

In an embodiment, the beam splitter assembly has a prism structure or a prism-like structure.

In an embodiment, the optical device further includes a driving mechanism, and the driving mechanism is connected with the beam splitter assembly. The driving mechanism is manually driven, mechanically driven, electrically driven, magnetically driven and/or electromagnetically driven.

In an embodiment, the structured light generation unit includes at least one light source and an optical element group. The optical element group includes a diffractive optical element, a refractive optical element or a reflective optical element corresponding to the first structured light pattern and the second structured light pattern.

In an embodiment, the structured light generation unit further includes a collimating lens, and the collimating lens is arranged between the light source and the optical element group. After plural source beams from the light source are collimated by the collimating lens, the collimated source beams are directed to the optical element group.

In an embodiment, the light source includes a laser diode, a light emitting diode, an organic light emitting diode and/or a thermal source.

In an embodiment, the at least one light source includes plural light sources, which are arranged in a staggered form. The plural light sources have different polarization properties or different wavebands/intensities. The plural light sources are programmable, so that the plural light sources are turned on, attenuated or turned off according to a time sequence.

In an embodiment, the optical device further includes at least one conversion lens module, and the at least one conversion lens module is arranged between the structured light generation unit and the projection surface. After the plural light beams of the structured light are transmitted through the beam splitter assembly and the conversion lens module and projected on the projection surface, the first structured light pattern and the second structured light pattern are formed on the projection surface. By controlling the conversion lens module to change directions of the plural light beams of the structured light travelling through the conversion lens module, at least one of the first structured light pattern and the second structured light pattern is correspondingly scaled up or scaled down.

In accordance with another aspect of the present invention, there is provided an optical device. The optical device includes a structured light generation unit and a beam splitter assembly. The structured light generation unit generates a structured light along an optical axis. The beam splitter assembly has the optical axis. First portions of plural light beams of the structured light are transmitted through the beam splitter assembly and projected on a projection surface along the optical axis, so that a first structured light pattern is formed on the projection surface. Second portions of the plural light beams of the structured light are transmitted through the beam splitter assembly and projected on the projection surface along an optical path different from the optical axis, so that a second structured light pattern is formed on the projection surface.

In an embodiment, the beam splitter assembly further includes a semi-transmissive semi-reflective structure and a total reflection structure. The semi-transmissive semi-reflective structure is arranged in the optical axis, and the total reflection structure is arranged in the optical path.

In an embodiment, the second structured light pattern is a scale-up pattern of the first structured light pattern, or the second structured light pattern is a scale-down pattern of the first structured light pattern, or the second structured light pattern and the first structured light pattern are as large as each other but not completely overlapped with each other.

In an embodiment, a light-inputting side of the beam splitter assembly includes a light-inputting surface and the total reflection structure, and a light-exiting side of the beam splitter assembly is coated with the semi-transmissive semi-reflective structure. After the plural light beams of the structured light are directed to the semi-transmissive semi-reflective structure through the light-inputting surface, the first portions of the plural light beams of the structured light are projected out to the projection surface through the semi-transmissive semi-reflective structure so as to form the first structured light pattern on the projection surface. In addition, the second portions of the plural light beams are reflected by the semi-transmissive semi-reflective structure and the total reflection structure sequentially and projected out to the projection surface through the semi-transmissive semi-reflective structure so as to form the second structured light pattern on the projection surface. Alternatively, a light-inputting side of the beam splitter assembly includes a light-inputting surface and the total reflection structure, and a light-exiting side of the beam splitter assembly is coated with the semi-transmissive semi-reflective structure and an anti-reflective structure. After the plural light beams of the structured light are directed to the semi-transmissive semi-reflective structure through the light-inputting surface, the first portions of the plural light beams of the structured light are projected out to the projection surface through the semi-transmissive semi-reflective structure so as to form the first structured light pattern on the projection surface. In addition, the second portions of the plural light beams are reflected by the semi-transmissive semi-reflective structure and the total reflection structure sequentially and projected out to the projection surface through the anti-reflective structure so as to form the second structured light pattern on the projection surface.

In an embodiment, the beam splitter assembly is a single-wedge beam splitter assembly, a double-wedge beam splitter assembly or a combined beam splitter assembly.

In an embodiment, a numerical aperture of the beam splitter assembly covers the beam spread angles and ranges corresponding to the first structured light pattern and the second structured light pattern.

In an embodiment, the beam splitter assembly is made of a plastic material, and produced by an injection molding process.

In an embodiment, the beam splitter assembly is produced by forming an ultraviolet curable material on a substrate, wherein the substrate is made of a plastic material, a glass material or silicon.

In an embodiment, the beam splitter assembly is made of an ultraviolet curable material, and directly formed or indirectly formed by multiple steps.

In an embodiment, the beam splitter assembly is made of a thermosetting material, and directly formed or indirectly formed by multiple steps.

In an embodiment, the beam splitter assembly has an asymmetric aspheric surface.

In an embodiment, the beam splitter assembly has a prism structure or a prism-like structure.

In an embodiment, the optical device further includes a driving mechanism, and the driving mechanism is connected with the beam splitter assembly. The driving mechanism is manually driven, mechanically driven, electrically driven, magnetically driven and/or electromagnetically driven.

In an embodiment, the structured light generation unit includes at least one light source and an optical element group. The optical element group includes a diffractive optical element, a refractive optical element or a reflective optical element corresponding to the first structured light pattern and the second structured light pattern.

In an embodiment, the structured light generation unit further includes a collimating lens, and the collimating lens is arranged between the light source and the optical element group. After plural source beams from the light source are collimated by the collimating lens, the collimated source beams are directed to the optical element group.

In an embodiment, the light source includes a laser diode, a light emitting diode, an organic light emitting diode and/or a thermal source.

In an embodiment, the at least one light source includes plural light sources, which are arranged in a staggered form. The plural light sources have different polarization properties or different wavebands/intensities. The plural light sources are programmable, so that the plural light sources are turned on, attenuated or turned off according to a time sequence.

In an embodiment, the optical device further includes at least one conversion lens module, and the at least one conversion lens module is arranged between the structured light generation unit and the projection surface. After the plural light beams of the structured light are transmitted through the beam splitter assembly and the conversion lens module and projected on the projection surface, the first structured light pattern and the second structured light pattern are formed on the projection surface. By controlling the conversion lens module to change directions of the plural light beams of the structured light travelling through the conversion lens module, at least one of the first structured light pattern and the second structured light pattern is correspondingly scaled up or scaled down.

From the above descriptions, the optical device comprises a structured light generation unit and a beam splitter assembly. A portion of a structured light is transmitted through the beam splitter assembly and projected on a projection surface, so that a first structured light pattern is formed on the projection surface. Another portion of a structured light is reflected by the beam splitter assembly and projected on a projection surface along a different path, so that a second structured light pattern is formed on the projection surface. The beam splitter assembly is used for splitting the original structured light. Consequently, the number of structured light patterns on the projection surface is increased. For example, the numbers of lines, planes and/or grids on the projection surface are doubled, or the projected area is changed. Consequently, the structured light pattern cannot be used in the subsequent process of precisely calculating the spatial information. Moreover, the resolution is increased, and the projected contents of the structured light pattern are more diversified.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 5 schematically illustrates the optical paths of an optical device according to a fifth embodiment of the present invention.

DETAILED DESCRIPTION OF THE PREFERRED EMBODIMENT

Figure 1:
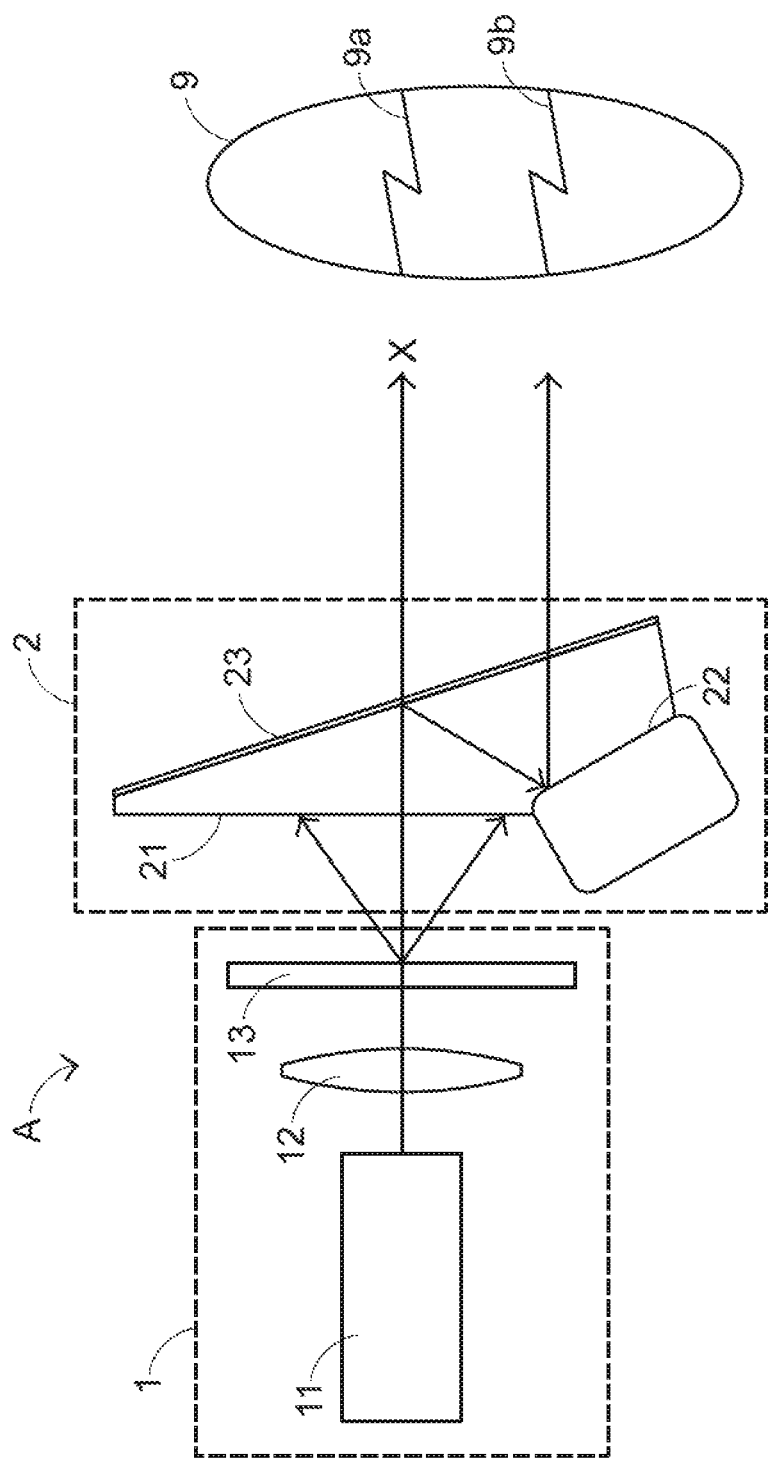
FIG. 1 schematically illustrates the optical paths of an optical device according to a first embodiment of the present invention.

FIG. 1 schematically illustrates the optical paths of an optical device according to a first embodiment of the present invention.

As shown in FIG. 1, the optical device A comprises a structured light generation unit 1 and a beam splitter assembly 2. The structured light generation unit 1 is used for generating a structured light. The beam splitter assembly 2 is arranged in a travelling path of the structured light. That is, the beam splitter assembly 2 is arranged between the structured light generation unit 1 and a projection surface 9. For example, the projection surface 9 is a surface of an object. The beam splitter assembly 2 is used for splitting the structure light in order to increase the number of structured light patterns on the projection surface 9. Please refer to FIG. 1. In particular, a portion of the structured light is transmitted through the beam splitter assembly 2 and projected on the projection surface 9, so that a first structured light pattern 9a is formed on the projection surface 9. Moreover, another portion of the structured light is reflected by the beam splitter assembly 2 and projected on the projection surface 9 along another path, so that a second structured light pattern 9b is formed on the projection surface 9. In this embodiment, the numbers of the lines, planes and/or grids on the projection surface 9 are doubled. The structure of the optical device A will be illustrated in more detailed as follows.

In the optical device A of this embodiment, the beam splitter assembly 2 has an optical axis X. The structured light generation unit 1 generates the structure light along the optical axis X. A light-inputting side of the beam splitter assembly 2 that is near the structured light generation unit 1 comprises a light-inputting surface 21 and a total reflection structure 22. A light-exiting side of the beam splitter assembly 2 that is away from the structured light generation unit 1 comprises a semi-transmissive semi-reflective structure 23. When a light strikes the semi-transmissive semi-reflective structure 23, a portion of the light is allowed to pass through the semi-transmissive semi-reflective structure 23 and another portion of the light is reflected by the semi-transmissive semi-reflective structure 23. In this embodiment, first portions of the plural light beams of the structured light from the structured light generation unit 1 are transmitted through the light-inputting surface 21 and the semi-transmissive semi-reflective structure 23 of the beam splitter assembly 2 along the optical axis X and projected on the projection surface 9. Consequently, the first structured light pattern 9a is formed on the projection surface 9. Moreover, second portions of the plural light beams of the structured light are reflected by the semi-transmissive semi-reflective structure 23 and the total reflection structure 22 of the beam splitter assembly 2 sequentially along a path different from the optical axis X and projected on the projection surface 9. That is, the second portions of the light beams are propagated along another optical path. Consequently, the number of the structured light patterns on the projection surface 9 is increased. In comparison with the conventional optical device, the numbers of the lines, planes and/or grids on the projection surface 9 are doubled.

In this embodiment, the surface of the light-inputting side and the surface of the light-exiting side are in parallel with each other, and there is an included angle between the surface of the light-inputting side and the surface of the light-exiting side. Consequently, the beam splitter assembly 2 has a wedge shape when the beam splitter assembly 2 is viewed from a specified lateral side.

The first structured light pattern 9a and the second structured light pattern 9b are originated from the same structured light generation unit 1. Consequently, the first structured light pattern 9a and the second structured light pattern 9b have similar patterns. However, since the optical path of the light beams corresponding to the first structured light pattern 9a and the light beams corresponding to the second structured light pattern 9b are different, the shapes, sizes and/or positions of the first structured light pattern 9a and the second structured light pattern 9b are different.

In other words, the first structured light pattern 9a and the second structured light pattern 9b have the following relationships. For example, the second structured light pattern 9b is a scale-up pattern of the first structured light pattern 9a. Alternatively, the second structured light pattern 9b is a scale-down pattern of the first structured light pattern 9a. Alternatively, the second structured light pattern 9b is as large as the first structured light pattern 9a, but the imaged position of the second structured light pattern 9b is deviated from the imaged position of the first structured light pattern 9a. That is, the first structured light pattern 9a and the second structured light pattern 9b are not completely overlapped with each other. For succinctness and brevity, the first structured light pattern 9a is indicated by a broken line, and the second structured light pattern 9b is indicated by another adjacent broken line. In practice, the first structured light pattern 9a and the second structured light pattern 9b produced by the optical device A are more complicated.

The beam splitter assembly 2 has a prism structure or a quasi-prism (or prism-like) structure. In an embodiment, the beam splitter assembly 2 has an asymmetric aspheric surface. In an embodiment, the beam splitter assembly 2 is made of a plastic material, and produced by an injection molding process. Alternatively, the beam splitter assembly 2 is made of an ultraviolet (UV) curable material, and directly formed or indirectly formed by multiple steps. Alternatively, the beam splitter assembly 2 is made of a thermosetting material, and directly formed or indirectly formed by multiple steps. Alternatively, the beam splitter assembly 2 is produced by forming an ultraviolet curable material on a substrate (not shown), wherein the substrate is made of a plastic material, a glass material or silicon. Moreover, the semi-transmissive semi-reflective structure 23 and the total reflection structure 22 are coatings such as uniform coatings or non-uniform coatings. In case that the semi-transmissive semi-reflective structure 23 and the total reflection structure 22 are non-uniform coatings, the thicknesses of the coatings are not uniformly distributed. Moreover, the numerical aperture (NA) of the beam splitter assembly 2 covers beam spread angles and ranges corresponding to the first structured light pattern 9a and the second structured light pattern 9b. Consequently, the light leakage problem can be effectively reduced.

For easy control and diversity, the optical device A further comprises a driving mechanism (not shown). The driving mechanism is connected with the beam splitter assembly 2. The driving mechanism is manually driven, mechanically driven, electrically driven, magnetically driven and/or electromagnetically driven. Moreover, the beam splitter assembly 2 is detachably disposed within the optical device A. In case that the beam splitter assembly 2 is removed from the optical device A, the optical device A can implement a lighting function of a general optical device but does not have the beam-splitting function.

The structure of the structured light generation unit 1 will be illustrated in more details as follows. The structured light generation unit 1 comprises at least one light source 11 and an optical element group 13. The optical element group 13 comprises a diffractive optical element (DOE), a refractive optical element or a reflective optical element corresponding to the first structured light pattern 9a and the second structured light pattern 9b. The light source 11 is used for providing plural source beams. After the plural source beams pass through the optical element group 13, the structured light is generated. In an embodiment, the at least one light source 11 comprises plural light sources 11, which are arranged in a staggered form. Moreover, the plural light sources 11 have different polarization properties or different wavebands/intensities. In an embodiment, the plural light sources 11 are programmable. Consequently, the plural light sources 11 are turned on, attenuated or turned off according to a time sequence. In this embodiment, after the plural source beams from the light source 11 pass through the diffractive optical element, the structured light is generated. Alternatively, in another embodiment, the structured light is generated after the plural source beams from the light source 11 pass through a refractive optical element and a reflective optical element. For example, the light source 11 includes a laser diode (LD), a light emitting diode (LED), an organic light emitting diode (OLED) and/or a thermal source.

The structured light generation unit 1 further comprises a collimating lens 12. The collimating lens 12 is arranged between the light source 11 and the optical element group 13. After the plural source beams from the light source 11 are collimated by the collimating lens 12, the collimated source beams are directed to the optical element group 13.

Figure 2:
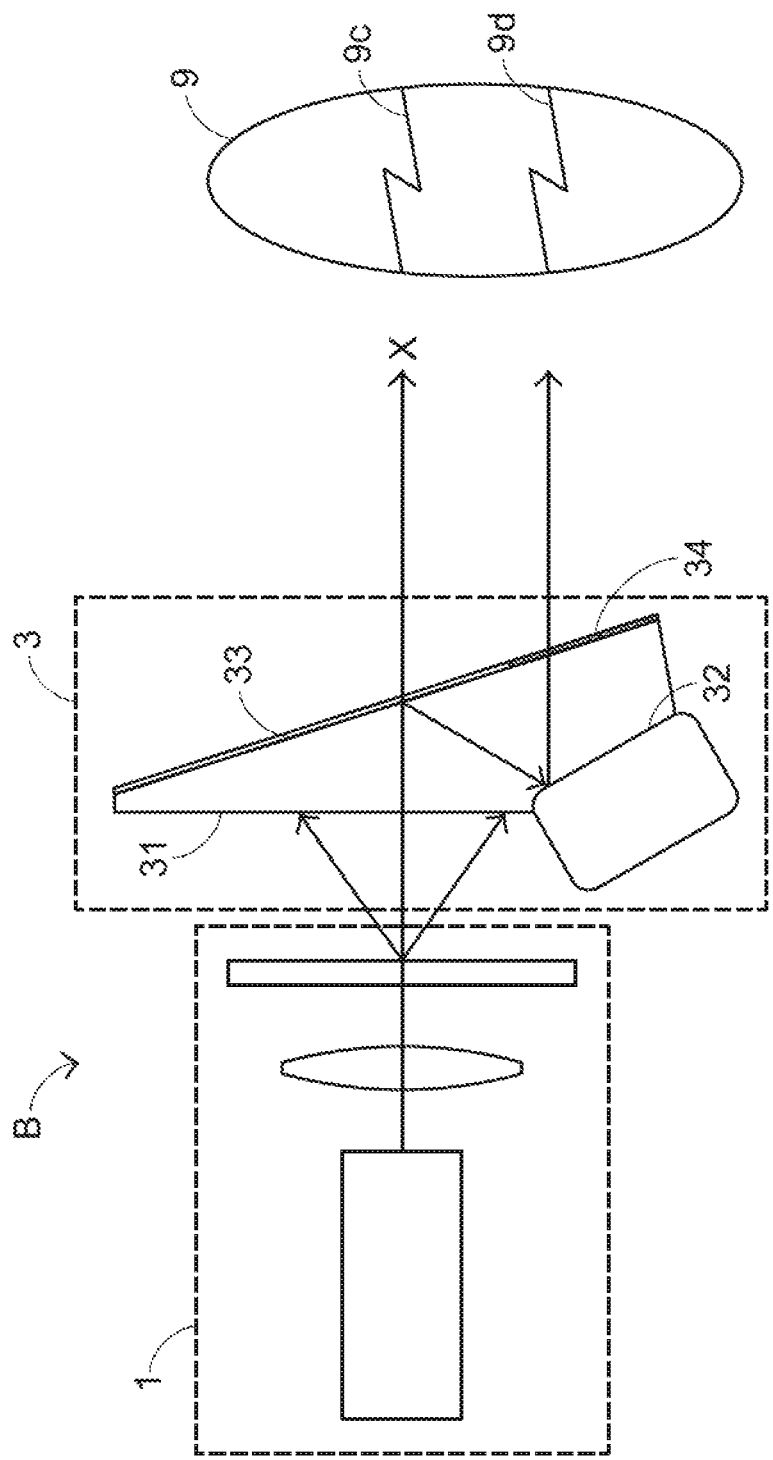
FIG. 2 schematically illustrates the optical paths of an optical device according to a second embodiment of the present invention.

FIG. 2 schematically illustrates the optical paths of an optical device according to a second embodiment of the present invention. The structure of the optical device B of this embodiment is similar to the structure of the optical device of the first embodiment. In this embodiment, the optical device B comprises a structured light generation unit 1 and a beam splitter assembly 3. The structured light generation unit 1 is used for generating a structured light. The beam splitter assembly 3 is arranged in a travelling path of the structured light. That is, the beam splitter assembly 3 is arranged between the structured light generation unit 1 and a projection surface 9. For example, the projection surface 9 is a surface of an object. The beam splitter assembly 3 is used for splitting the structure light. A light-inputting side of the beam splitter assembly 3 comprises a light-inputting surface 31 and a total reflection structure 32. In comparison with the first embodiment, the beam splitter assembly 3 is distinguished from the beam splitter assembly 2. In this embodiment, a light-exiting side of the beam splitter assembly 3 comprises a semi-transmissive semi-reflective structure 33 and an anti-reflective structure 34, which are coatings. In this embodiment, first portions of the plural light beams of the structured light are transmitted through the light-inputting surface 31 and the semi-transmissive semi-reflective structure 33. Consequently, a first structured light pattern 9c is formed on the projection surface 9. Moreover, second portions of the plural light beams of the structured light are reflected by the semi-transmissive semi-reflective structure 33 and the total reflection structure 32 sequentially, transmitted through the anti-reflective structure 34, and projected on the projection surface 9. Consequently, a second structured light pattern 9d is formed on the projection surface 9.

In this embodiment, the anti-reflective structure 34 is formed at a proper position of the beam splitter assembly 3. Consequently, the second portions of the plural light beams of the structured light reflected by the total reflection structure 32 are almost transmitted through the anti-reflective structure 34 and projected externally onto the projection surface 9. Since the light beams are almost not reflected back, the imaging luminance and the imaging quality of the second structured light pattern 9d are enhanced.

Figure 3:
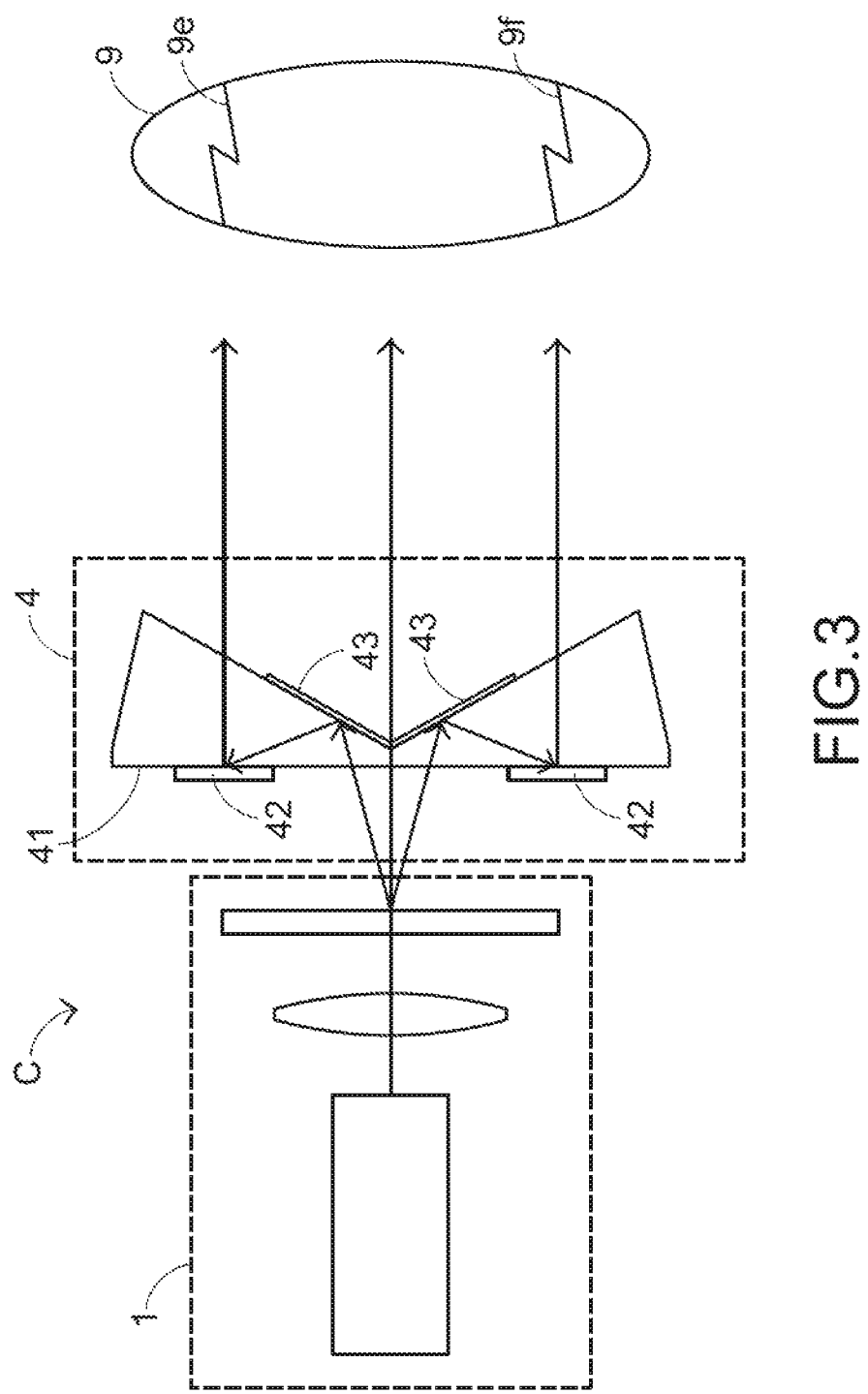
FIG. 3 schematically illustrates the optical paths of an optical device according to a third embodiment of the present invention.

FIG. 3 schematically illustrates the optical paths of an optical device according to a third embodiment of the present invention. The structure of the optical device C of this embodiment is similar to the structure of the optical device of the first embodiment. In this embodiment, the optical device C comprises a structured light generation unit 1 and a beam splitter assembly 4. The beam splitter assembly 4 of this embodiment is distinguished from the beam splitter assembly 2 of the first embodiment and the beam splitter assembly 3 of the second embodiment. The structured light generation unit 1 is used for generating a structured light. The beam splitter assembly 4 is arranged in a travelling path of the structured light. A light-inputting side of the beam splitter assembly 4 comprises a light-inputting surface 41 and two total reflection structures 42. Consequently, in comparison with the wedge shape of the beam splitter assembly of the first embodiment, the beam splitter assembly 42 of this embodiment has a double-wedge shape when the beam splitter assembly 4 is viewed from a specified lateral side. The path of the structured light passing through any wedge structure of the beam splitter assembly 4 is similar to the path of the structured light passing through the single-wedge structure of the above two embodiments, and are not redundantly described herein. Consequently, a first structured light pattern 9e and a second structured light pattern 9f are formed on the projection surface 9. Moreover, by changing the structure of the beam splitter assembly, a third structured light pattern, a fourth structured light pattern or more structured light patterns can be projected out. In other words, the number of the structured light patterns is not restricted.

In this embodiment, a light-exiting side of the beam splitter assembly 4 is coated with a semi-transmissive semi-reflective structure 43. Alternatively, the light-exiting side of the beam splitter assembly 4 is coated with both of the semi-transmissive semi-reflective structure 43 and an anti-reflective structure (not shown). The possible configurations are similar to those of the above two embodiments, and are not redundantly described herein.

Figure 4:
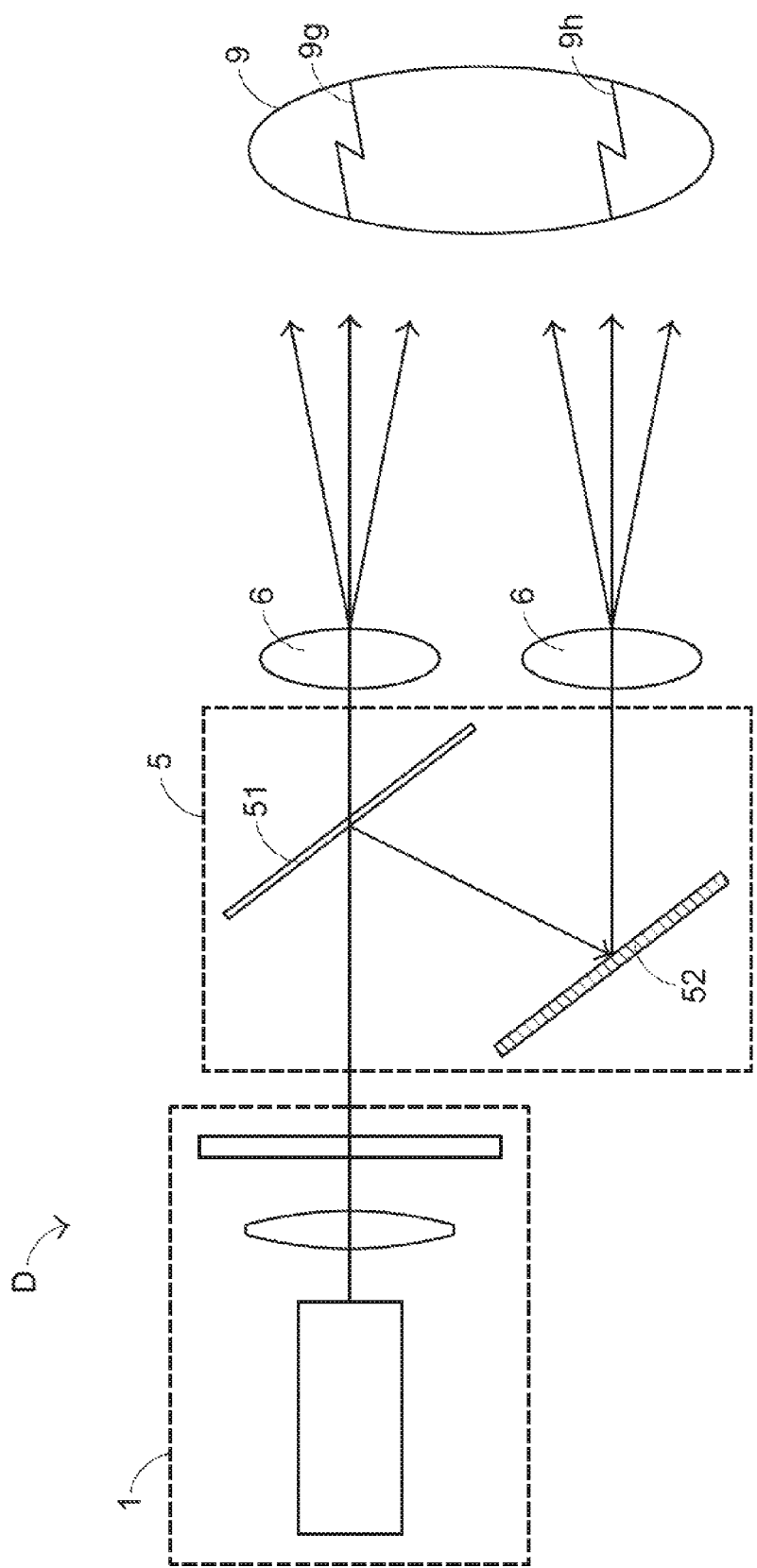
FIG. 4 schematically illustrates the optical paths of an optical device according to a fourth embodiment of the present invention.

FIG. 4 schematically illustrates the optical paths of an optical device according to a fourth embodiment of the present invention. In this embodiment, the optical device D comprises a structured light generation unit 1 and a beam splitter assembly 5. The beam splitter assembly 5 of this embodiment is distinguished from the beam splitter assembly of the above three embodiments. The structured light generation unit 1 is used for generating a structured light. The beam splitter assembly 5 is arranged in a travelling path of the structured light. In this embodiment, the beam splitter assembly 5 is a combined beam splitter assembly comprising plural lenses/mirrors with different functions. The combined beam splitter assembly comprises a semi-transmissive semi-reflective plate 51 and a total reflection plate 52. In this embodiment, first portions of the plural light beams of the structured light are transmitted through the semi-transmissive semi-reflective plate 51 and projected externally on the projection surface 9. Consequently, a first structured light pattern 9g is formed on the projection surface 9. Moreover, second portions of the plural light beams of the structured light are reflected by the semi-transmissive semi-reflective plate 51 and the total reflection plate 52 sequentially, and projected on the projection surface 9. Consequently, a second structured light pattern 9h is formed on the projection surface 9. Like the above three embodiments, the shapes and/or the positions of the first structured light pattern 9g and the second structured light pattern 9h are different. Consequently, the number of lines to be recognized will be increased.

In this embodiment, the optical device D further comprises two conversion lens modules 6 corresponding to the light-exiting sides of the semi-transmissive semi-reflective plate 51 and the total reflection plate 52, respectively. The structured light generation unit 1 is used for generating a structured light. The conversion lens modules 6 are arranged between the beam splitter assembly 5 and the projection surface 9. The plural light beams of the structured light from the structured light generation unit 1 pass through the beam splitter assembly 5 and the conversion lens modules 6. By moving the conversion lens modules 6, the first structured light pattern 9g and the second structured light pattern 9h shown on the projection surface 9 are selectively scaled down or scaled up. Consequently, the lighting angle is adjustable. In FIG. 4, only a single component of the conversion lens module 6 is shown. It is noted that the conversion lens module 6 may be composed of plural lenses according to the practical requirements.

FIG. 5 schematically illustrates the optical paths of an optical device according to a fifth embodiment of the present invention. In this embodiment, the optical device E comprises a structured light generation unit 1 and a beam splitter assembly 7. The beam splitter assembly 7 of this embodiment is distinguished from the beam splitter assembly of the fourth embodiment. The structured light generation unit 1 is used for generating a structured light. The beam splitter assembly 7 is arranged in a travelling path of the structured light. In this embodiment, the beam splitter assembly 7 is a combined beam splitter assembly comprising plural lenses/mirrors with different functions. Like the further embodiment, the combined beam splitter assembly of this embodiment comprises a semi-transmissive semi-reflective plate 71 and at least one total reflection plate 72. In comparison with the fourth embodiment, the combined beam splitter assembly of this embodiment further comprises at least one anti-reflective plate 73.

In this embodiment, the combined beam splitter assembly comprises one semi-transmissive semi-reflective plate 71, three total reflection plates 72 and two anti-reflective plates 73. The two anti-reflective plates 73 are arranged in a light-inputting side and a light-exiting side of the beam splitter assembly 7, respectively. Consequently, the light beams are almost propagated along the desired paths without being reflected back. Moreover, the semi-transmissive semi-reflective plate 71 is arranged in a travelling path of the structured light. In this embodiment, first portions of the plural light beams of the structured light are transmitted through the semi-transmissive semi-reflective plate 71 and projected externally on the projection surface 9. Consequently, a first structured light pattern 9$i$ is formed on the projection surface 9. Moreover, second portions of the plural light beams of the structured light are reflected by the semi-transmissive semi-reflective plate 71 and one of the three total reflection plates 72 sequentially, and projected on the projection surface 9. Consequently, a second structured light pattern 9$j$ that is different from the first structured light pattern 9$i$ is formed on the projection surface 9. As shown in FIG. 5, one specified total reflection plate 72 is feasible for reflecting the light beams. Since two additional total reflection plates 72 are inserted into the gaps between the semi-transmissive semi-reflective plate 71, the specified total reflection plate 72 and the two anti-reflective plates 73, the possibility of causing light leakage is minimized and the light utilization efficiency is enhanced. It is noted that the number of the additional total reflection plates is not restricted.

From the above descriptions, the optical device comprises the beam splitter assembly. The beam splitter assembly is used for splitting the original structured light. Consequently, the number of structured light patterns on the projection surface is increased. For example, the numbers of lines, planes and/or grids on the projection surface are doubled, or the projected area is changed. Consequently, the structured light pattern cannot be used in the subsequent process of precisely calculating the spatial information. Moreover, the resolution is increased, and the projected contents of the structured light pattern are more diversified.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical device, comprising:
a structured light generation unit generating a structured light; and
a beam splitter assembly arranged in a travelling path of the structured light, and comprising a semi-transmissive semi-reflective structure and a total reflection structure, wherein first portions of plural light beams of the structured light are transmitted through the semi-transmissive semi-reflective structure of the beam splitter assembly and projected on a projection surface, so that a first structured light pattern is formed on the projection surface, wherein second portions of the plural light beams of the structured light are reflected by the semi-transmissive semi-reflective structure and the total reflection structure of the beam splitter assembly sequentially and projected on the projection surface, so that a second structured light pattern is formed on the projection surface;

wherein a light-inputting side of the beam splitter assembly comprises a light-inputting surface and the total reflection structure, and a light-exiting side of the beam splitter assembly is coated with the semi-transmissive semi-reflective structure, wherein after the plural light beams of the structured light are directed to the semi-transmissive semi-reflective structure through the light-inputting surface, the first portions of the plural light beams of the structured light are projected out to the projection surface through the semi-transmissive semi-reflective structure so as to form the first structured light pattern on the projection surface, and the second portions of the plural light beams are reflected by the semi-transmissive semi-reflective structure and the total reflection structure sequentially and projected out to the projection surface through the semi-transmissive semi-reflective structure so as to form the second structured light pattern on the projection surface; or wherein a light-inputting side of the beam splitter assembly comprises a light-inputting surface and the total reflection structure, and a light-exiting side of the beam splitter assembly is coated with the semi-transmissive semi-reflective structure and an anti-reflective structure, wherein after the plural light beams of the structured light are directed to the semi-transmissive semi-reflective structure through the light-inputting surface, the first portions of the plural light beams of the structured light are projected out to the projection surface through the semi-transmissive semi-reflective structure so as to form the first structured light pattern on the projection surface, and the second portions of the plural light beams are reflected by the semi-transmissive semi-reflective structure and the total reflection structure sequentially and projected out to the projection surface through the anti-reflective structure so as to form the second structured light pattern on the projection surface.

2. The optical device according to claim 1, wherein the second structured light pattern is a scale-up pattern of the first structured light pattern, or the second structured light pattern is a scale-down pattern of the first structured light pattern, or the second structured light pattern and the first structured light pattern are as large as each other but not completely overlapped with each other.

3. The optical device according to claim 1, wherein at least one of the semi-transmissive semi-reflective structure and the total reflection structure is a coating with a non-uniform thickness.

4. The optical device according to claim 1, wherein the beam splitter assembly is a single-wedge beam splitter assembly, a double-wedge beam splitter assembly or a combined beam splitter assembly.

5. The optical device according to claim 1, wherein a numerical aperture of the beam splitter assembly covers beam spread angles and ranges corresponding to the first structured light pattern and the second structured light pattern.

6. The optical device according to claim 1, wherein the beam splitter assembly is made of a plastic material, and produced by an injection molding process.

7. The optical device according to claim 1, wherein the beam splitter assembly is produced by forming an ultraviolet curable material on a substrate, wherein the substrate is made of a plastic material, a glass material or silicon.

8. The optical device according to claim 1, wherein the beam splitter assembly is made of an ultraviolet curable material, and directly formed or indirectly formed by multiple steps.

9. The optical device according to claim 1, wherein the beam splitter assembly is made of a thermosetting material, and directly formed or indirectly formed by multiple steps.

10. The optical device according to claim 1, wherein the beam splitter assembly has an asymmetric aspheric surface.

11. The optical device according to claim 1, wherein the beam splitter assembly has a prism structure or a prism-like structure.

12. The optical device according to claim 1, wherein the optical device further comprises a driving mechanism, and the driving mechanism is connected with the beam splitter assembly, wherein the driving mechanism is manually driven, mechanically driven, electrically driven, magnetically driven and/or electromagnetically driven.

13. The optical device according to claim 1, wherein the structured light generation unit comprises at least one light source and an optical element group, wherein the optical element group comprises a diffractive optical element, a refractive optical element or a reflective optical element corresponding to the first structured light pattern and the second structured light pattern.

14. The optical device according to claim 13, wherein the structured light generation unit further comprises a collimating lens, and the collimating lens is arranged between the light source and the optical element group, wherein after plural source beams from the light source are collimated by the collimating lens, the collimated source beams are directed to the optical element group.

15. The optical device according to claim 14, wherein the light source includes a laser diode, a light emitting diode, an organic light emitting diode and/or a thermal source.

16. The optical device according to claim 15, wherein the at least one light source comprises plural light sources, which are arranged in a staggered form, wherein the plural light sources have different polarization properties or different wavebands/intensities, wherein the plural light sources are programmable, so that the plural light sources are turned on, attenuated or turned off according to a time sequence.

17. The optical device according to claim 1, wherein the optical device further comprises at least one conversion lens module, and the at least one conversion lens module is arranged between the structured light generation unit and the projection surface, wherein after the plural light beams of the structured light are transmitted through the beam splitter assembly and the conversion lens module and projected on the projection surface, the first structured light pattern and the second structured light pattern are fainted on the projection surface, wherein by controlling the conversion lens module to change directions of the plural light beams of the structured light travelling through the conversion lens module, at least one of the first structured light pattern and the second structured light pattern is correspondingly scaled up or scaled down.

18. An optical device, comprising:
a structured light generation unit generating a structured light along an optical axis; and
a beam splitter assembly having a semi-transmissive semi-reflective structure, a total reflection structure and the optical axis, wherein the semi-transmissive semi-reflective structure is arranged in the optical axis, and the total reflection structure is arranged in an optical path,
wherein first portions of plural light beams of the structured light are transmitted through the beam splitter assembly and projected on a projection surface along the optical axis, so that a first structured light pattern is formed on the projection surface, wherein second portions of the plural light beams of the structured light are transmitted through the beam splitter assembly and projected on the projection surface along the optical path different from the optical axis, so that a second structured light pattern is formed on the projection surface;
wherein a light-inputting side of the beam splitter assembly comprises a light-inputting surface and the total reflection structure, and a light-exiting side of the beam splitter assembly is coated with the semi-transmissive semi-reflective structure, wherein after the plural light beams of the structured light are directed to the semi-transmissive semi-reflective structure through the light-inputting surface, the first portions of the plural light beams of the structured light are projected out to the projection surface through the semi-transmissive semi-reflective structure so as to form the first structured light pattern on the projection surface, and the second portions of the plural light beams are reflected by the semi-transmissive semi-reflective structure and the total reflection structure sequentially and projected out to the projection surface through the semi-transmissive semi-reflective structure so as to form the second structured light pattern on the projection surface; or
wherein a light-inputting side of the beam splitter assembly comprises a light-inputting surface and the total reflection structure, and a light-exiting side of the beam splitter assembly is coated with the semi-transmissive semi-reflective structure and an anti-reflective structure, wherein after the plural light beams of the structured light are directed to the semi-transmissive semi-reflective structure through the light-inputting surface, the first portions of the plural light beams of the structured light are projected out to the projection surface through the semi-transmissive semi-reflective structure so as to form the first structured light pattern on the projection surface, and the second portions of the plural light beams are reflected by the semi-transmissive semi-reflective structure and the total reflection structure sequentially and projected out to the projection surface through the anti-reflective structure so as to form the second structured light pattern on the projection surface.

19. The optical device according to claim 18, wherein the second structured light pattern is a scale-up pattern of the first structured light pattern, or the second structured light pattern is a scale-down pattern of the first structured light pattern, or the second structured light pattern and the first structured light pattern are as large as each other but not completely overlapped with each other.

20. The optical device according to claim 18, wherein the beam splitter assembly is a single-wedge beam splitter assembly, a double-wedge beam splitter assembly or a combined beam splitter assembly.

21. The optical device according to claim 18, wherein a numerical aperture of the beam splitter assembly covers beam spread angles and ranges corresponding to the first structured light pattern and the second structured light pattern.

22. The optical device according to claim 18, wherein the beam splitter assembly is made of a plastic material, and produced by an injection molding process.

23. The optical device according to claim 18, wherein the beam splitter assembly is produced by forming an ultraviolet curable material on a substrate, wherein the substrate is made of a plastic material, a glass material or silicon.

24. The optical device according to claim 18, wherein the beam splitter assembly is made of an ultraviolet curable material, and directly formed or indirectly formed by multiple steps.

25. The optical device according to claim 18, wherein the beam splitter assembly is made of a thermosetting material, and directly formed or indirectly formed by multiple steps.

26. The optical device according to claim 18, wherein the beam splitter assembly has an asymmetric aspheric surface.

27. The optical device according to claim 18, wherein the optical device further comprises a driving mechanism, and the driving mechanism is connected with the beam splitter assembly, wherein the driving mechanism is manually driven, mechanically driven, electrically driven, magnetically driven and/or electromagnetically driven.

28. The optical device according to claim 18, wherein the structured light generation unit comprises at least one light source and an optical element group, wherein the optical element group comprises a diffractive optical element, a refractive optical element or a reflective optical element corresponding to the first structured light pattern and the second structured light pattern.

29. The optical device according to claim 28, wherein the structured light generation unit further comprises a collimating lens, and the collimating lens is arranged between the light source and the optical element group, wherein after plural source beams from the light source are collimated by the collimating lens, the collimated source beams are directed to the optical element group.

30. The optical device according to claim 29, wherein the light source includes a laser diode, a light emitting diode, an organic light emitting diode and/or a thermal source.

31. The optical device according to claim 30, wherein the at least one light source comprises plural light sources, which are arranged in a staggered form, wherein the plural light sources have different polarization properties or different wavebands/intensities, wherein the plural light sources are programmable, so that the plural light sources are turned on, attenuated or turned off according to a time sequence.

32. The optical device according to claim 18, wherein the optical device further comprises at least one conversion lens module, and the at least one conversion lens module is arranged between the structured light generation unit and the projection surface, wherein after the plural light beams of the structured light are transmitted through the beam splitter assembly and the conversion lens module and projected on the projection surface, the first structured light pattern and the second structured light pattern are formed on the projection surface, wherein by controlling the conversion lens module to change directions of the plural light beams of the structured light travelling through the conversion lens module, at least one of the first structured light pattern and the second structured light pattern is correspondingly scaled up or scaled down.

* * * * *